(12) United States Patent
Gayton (10) Patent No.: US 10,740,664 B2
(45) Date of Patent: Aug. 11, 2020

(54) WIRELESS LOW POWER FLEXIBLE AND REMOVABLY ATTACHABLE TAG AND CORRESPONDING LOCATING DEVICE, SYSTEM, AND METHOD OF USE

(71) Applicant: Karen Gayton, Gainesville, GA (US)

(72) Inventor: Karen Gayton, Gainesville, GA (US)

( * ) Notice: Subject to any disclaimer, the term of this patent is extended or adjusted under 35 U.S.C. 154(b) by 0 days.

(21) Appl. No.: 15/849,704

(22) Filed: Dec. 21, 2017

(65) Prior Publication Data

US 2018/0239999 A1 Aug. 23, 2018

Related U.S. Application Data

(63) Continuation-in-part of application No. 15/641,136, filed on Jul. 3, 2017, now abandoned.

(60) Provisional application No. 62/357,790, filed on Jul. 1, 2016.

(51) Int. Cl.
| | |
|---|---|
| *G06K 19/02* | (2006.01) |
| *G06K 7/10* | (2006.01) |
| *G06K 19/077* | (2006.01) |
| *G06K 19/07* | (2006.01) |
| *G06Q 50/28* | (2012.01) |

(52) U.S. Cl.
CPC ....... *G06K 19/025* (2013.01); *G06K 7/10099* (2013.01); *G06K 19/0704* (2013.01); *G06K 19/07713* (2013.01); *G06Q 50/28* (2013.01)

(58) Field of Classification Search
CPC .................................................. G06K 19/025
USPC .................. 340/572.8, 571, 572.1–572.9
See application file for complete search history.

(56) References Cited

U.S. PATENT DOCUMENTS

| | | | | |
|---|---|---|---|---|
| 7,982,622 | B2 * | 7/2011 | Burchell | G01K 1/024 340/10.1 |
| 2007/0096875 | A1 * | 5/2007 | Waterhouse | G06K 19/07749 340/10.1 |
| 2012/0070158 | A1 * | 3/2012 | Allee | G06K 19/07766 398/182 |
| 2016/0125348 | A1 * | 5/2016 | Dyer | G06Q 10/06398 705/7.42 |
| 2016/0139237 | A1 * | 5/2016 | Connolly | G01S 5/02 340/10.1 |
| 2018/0239999 | A1 * | 8/2018 | Gayton | G06Q 50/28 |

\* cited by examiner

*Primary Examiner* — Qutbuddin Ghulamali
(74) *Attorney, Agent, or Firm* — Lainie E. Parker; Richard Blank (57) ABSTRACT

The present invention and method relates to a wireless low power flexible and removably attachable tag, a attaching device, and a wireless locating tracking initiator assembly, system and device which can be used to locate objects.

22 Claims, 5 Drawing Sheets

WIRELESS LOW POWER FLEXIBLE AND REMOVABLY ATTACHABLE TAG AND CORRESPONDING LOCATING DEVICE, SYSTEM, AND METHOD OF USE

CROSS-REFERENCE TO RELATED APPLICATIONS

This patent application is a continuation in part and claims the benefit of, and priority to U.S. non-Provisional patent application Ser. No. 15/641,136, filed on Jul. 3, 2017 and this non-provisional patent application is incorporated herein in its entirety by this reference.

This patent application claims the benefit of, and priority to U.S. Provisional Patent Application No. 62/357,790, filed on Jul. 1, 2016 and provisional patent application is incorporated herein in its entirety by this reference.

FIELD OF THE INVENTION

The present invention relates to location devices. More particularly, the present invention relates to low power and/or solar powered location tags with power conserving system, which in at least one current embodiment are flexible enough and small enough to attach through an attaching means (i.e. adhesive) to any Surface, and Smart Devices as part of a hand-held tracking initiator assembly, running a software application, all together used to determine the location of items or objects of any kind including but not limited to people and other living creatures.

BACKGROUND OF THE INVENTION

Currently, there are a number of ways in which a person can find a lost item, including physically searching for a lost item, or relying on tracking devices that are limited in their range of location detection. Additionally, there are currently a number of tracking devices used to locate lost items that require that a user attach a bulky and/or non-flexible tracking device to an item to find it if lost. The present invention provides a person who has lost an item to search for it by utilizing one or more of various types of signals available and the present invention allows a user to wirelessly locate a lost or misplaced piece item. By allowing a user to easily attach the small flexible tag of the present invention to a item using an adhesive method, a user is provided with the ability to use the present invention. A user is provided with the sense of security that the present invention has not fallen off the item the present invention is tracking with the use of adhesive. Also, the present invention can be more appealing to look at than big, bulky, attachable accessories, and is more cost effective than other accessories. The big problem of sufficient power in the tag to last for long periods of time is a significant focus of this invention. This invention provides a low power solution, a solar power solution, and a low power together with solar power solution.

SUMMARY OF THE INVENTION

The present invention is a wireless low power flexible and removeably attachable tag and corresponding locating system comprising of the following: A) at least one tracking initiator assembly comprising: at least one stand-alone Smart Device, or at least one Smart Device removeably attachable to at least one Docking Station, said Docking Station comprising of: a mechanical cradle to accept said at least one Smart Device; at least one Smart Device connector; at least one transmitter or at least one transceiver, said at least one transceiver comprising at least one transceiver transmitter and at least one transceiver receiver; at least one docking power source, said at least one docking power source derives from at least one of said at least one Smart Device, at least one non-rechargeable battery, at least one rechargeable battery, at least one capacitor, at least one solar cell and/or solar panel, at least one coil and/or transformer and/or resonant circuit, at least one voltage regulator and/or voltage converter, an external source derived from a wall current powered power supply and/or an external DC source; docking electronics and/or microprocessor; said at least one transmitter is capable of transmitting at least one transmitter emitting signal capable of modulating information and/or not modulating information, wherein said information is at least one code and/or address, or said at least one transceiver transmitter is capable of transmitting at least one transceiver transmitter emitting signal capable of modulating information and/or not modulating information, wherein said information is said at least one code and/or address, and said at least one transceiver receiver is capable of receiving at least one frequency and/or receiving at least one frequency with modulated information and/or at least one tag active transceiver transmitter transmission; B) a wireless low power removeable attachable Tag placed on or near an object and/or Surface to be tracked comprising: at least one housing with at least one attaching device and/or attachment area; a passive receiver requiring no power that produces an initiating signal as a result of receiving said transmitter emitting signal or said transceiver transmitter emitting signal; at least one tag power source, said at least one tag power source is at least one of at least one non-rechargeable battery, at least one rechargeable battery, at least one capacitor, at least one solar cell and/or solar panel, at least one coil and/or transformer and/or resonant circuit, at least one voltage regulator and/or voltage converter; tag electronics and/or microprocessor capable of being connected to and disconnected from said at least one tag power source; at least one tag active receiver or at least one tag active transceiver capable of being connected to and disconnected from said at least one tag power source, said at least one tag active transceiver comprising at least one tag active transceiver receiver and at least one tag active transceiver transmitter; at least one physical output component capable of being controlled by said tag electronics and/or microprocessor, said at least one physical output component comprising at least one of at least one light, at least one sound producing element, at least one vibrator and/or vibrating element; at least one stored code and/or address stored within said tag electronics and/or microprocessor; said at least one tag active receiver capable of receiving said transmitter emitting signal, or said at least one tag active transceiver receiver capable of receiving at least one said transceiver transmitter emitting signal and said at least one tag active transceiver transmitter capable of transmitting at least one tag active transceiver transmitter transmission; said tag electronics and/or microprocessor is activated by said initiating signal; said tag electronics and/or microprocessor capable of generating at least one power on signal capable of causing power be applied to and removed from said tag electronics and/or microprocessor; said at least one power on signal capable of causing power to be applied to and removed from said at least one tag active receiver or said at least one tag active transceiver; C) an tracking initiator assembly software application running in said tracking initiator assembly and tag software running in said tag, said tracking initiator assembly software application and said tag software interacting in a manner permitting communication between said tracking initiator assembly and said tag and to cause at least one output response in said tag comprising the following: selection of said object and/or Surface and/or said tag using said at least one stand-alone Smart Device or said at least one Smart Device, said selection causing the emission and/or transmission of at least one said transmitter emitting signal or at least one said transceiver transmitter emitting signal with or without modulation; reception of said at least one said transmitter emitting signal or at least one said transceiver transmitter emitting signal by said passive receiver; said passive receiver generates said initiating signal; said initiating signal causes said tag electronics and/or microprocessor to generate said at least one power on signal; said tag electronics and/or microprocessor initiates at least one timer producing at least one time out time; said at least one time out time capable of causing at least one power on signal to switch from at least one state to at least one other state, thus causing said power to be disconnected from said tag electronics and/or microprocessor and/or said at least one tag active receiver or at least one tag active transceiver; said tag active receiver or tag active transceiver receiver capable of demodulating said information and producing at least one receiver output; said receiver output being received by said tag electronics and/or microprocessor, said tag electronics and/or microprocessor decoding said at least one code and/or address and comparing to said at least one stored code and/or address, and if said at least one code and/or address is identical to said at least one stored code and/or address, producing at least one valid positive ID output; said at least one valid positive ID output triggering at least one of the following: at least one output sequence for at least one period of tag identification calling time, switching said at least one power on signal to a power off state.

The output sequence may be at least one of at least one light sequence, or at least one audio sequence.

Transmission from transmitter or transceiver transmitter may be at least one object found code to be received by said tag active receiver or tag active transceiver receiver, said at least one object found code causing said tag electronics and/or microprocessor and said tag active receiver to power down, said at least one object found code causing said tag electronics and/or microprocessor and said tag active transceiver to power down.

The smart device display can display any number of potentially missing objects able to be searched for and can display and search for an ever-expanding menu of icons and/or names of searchable things.

The tracking initiator assembly in at least one current embodiment can receive and/or transmit at least one of the following signals: GPS, Wi-Fi, RFID, radio wave, Bluetooth, radio-frequency, sonar, sonic, audio, vibration, light, solar energy, sound, and/or infrared.

The tag in at least one current embodiment can receive and/or transmit at least one of the following signals: GPS, Wi-Fi, RFID, radio wave, Bluetooth, radio-frequency, sonar, sonic, audio, vibration, light, solar energy, sound, and/or infrared.

The tracking initiator assembly in at least one current embodiment further comprises at least one power source. The at least one power source further maybe comprised of at least one of: at least one battery, at least one battery compartment, and/or at least one battery compartment door, at least one coil for harvesting electromagnetically coupled energy, a rectifier, at least one storage component, and/or voltage regulator, power management processor and/or system.

The apparatus in at least one current embodiment is or contains at least one remote control. The at least one remote control further comprises at least one button and/or switch or other controller capable of producing a signal corresponding to at least one said tag that, when depressed or initiated or activated, causes a query signal to be sent from said tracking initiator assembly and/or said remote control to said at least one said tag.

The wireless low power removeably attachable Tag if present further may be comprised at least one of the following: a speaker, an audio or sound producing device, a lighting system, a light source, and/or a vibrating device.

The at least one control device can send at least one signal from the at least one communication transmitter device or communication transmitter/receiver device located in the control device to the at least one communication receiver device or communication transmitter/receiver device located in/on/as tracking apparatus that results in the at least one speaker and/or audio device, if present, emitting a sound, the lighting system and/or light system, if present, illuminating, the vibrating device, if present, vibrating, and/or the at least one communication receiver device or communication transmitter/receiver device transmitting sending at least one signal to the at least one communication transmitter device or communication transmitter/receiver device.

A method of use for a wireless location device comprised of at least one of the following steps: at least one of downloading, initiating, running, and/or operating the apparatus software application running in said apparatus; placing at least one said tag possessing at least one address on or near at least one Surface and/or object that may need to be located at a future time; turning on and/or activating said apparatus; defining in said apparatus at least one Surface and/or object requiring location; causing a query signal comprising said at least one address to be sent from said apparatus; receiving said query signal by at least one tag; tag self identification that it is or is not the tag possessing at least one address and the tag being addressed; tag generating at least one output sequence for at least one period of time.

Hearing at least one sound emitted from the at least one speaker and/or sound system located in the at least one tag when the at least one control device sends information to, and retrieves information from the at least one tracking apparatus; seeing at least one light emitted from the at least one light source and/or lighting system located in the at least one tracking apparatus when the at least one control device sends information to, and/or retrieves information from the at least one tracking apparatus; feeling or listening for the vibration(s) of the at least one vibrating device located in the at least one tracking apparatus when the at least one control device sends information to, and retrieves information from the at least one tracking apparatus; the information/data, or other signals or interaction, between the at least one control device and the at least one tracking apparatus includes distance information between the devices; and/or the distance information between the at least one control device and the at least one tracking apparatus can be updated and/or continuously updated as it changes.

The method of use for a invention may include the following steps of further comprising the step of removing said tag from the at least one Surface.

The invention in at least one current embodiment wireless locating device further comprising at least one of the following: at least one LED light; at least one switch and/or at least one sensor and/or at least one connector; circuitry to control at least one LED light; and/or a transparent and/or translucent flexible exterior material permitting the transmission of light. at least one switch and/or at least one sensor and/or at least one connector can be sensed by and/or connected to electronics; said at least one switch and/or at least one sensor can be at least one of motion and/or acceleration and/or impact activated; motion and/or said at least one sensor output can cause electronics to remain active for a minimum period of time; if motion and/or said at least one sensor output has not caused activation for said minimum period of time, the electronics enters a low current sleep mode to conserve battery energy; motion and/or said at least one sensor output can initiate wake up of electronics from a low current mode; the wireless locating device further comprises electronics able to control the lighting of said at least one LED light in at least one sequence; and/or said at least one switch and/or at least one sensor activation can initiate at least one lighting sequence.

In at least one current embodiment of the invention at least one: lighting sequence is at least one of the following: repetitive, and/or random; lighting sequence can incorporate at least one of the following: constant timing, variable timing, and/or a dimming function; sensor can sense acoustic energy and/or audio from the environment and convert said acoustic energy and/or audio into a signal; and/or said at least one connector is a connector and/or jack for connecting to an audio source and/or power. The signal can be resolved into frequency and/or amplitude and/or a combination thereof. The frequency and/or amplitude and/or a combination thereof can control or affect the pattern and or intensity of LED lighting.

In at least one current embodiment the housing is flexible and bendable and it has an attaching device or method which allows for attaching to Surfaces preferably adhesive. A method for using the invention in at least one embodiment is comprised of the following steps: a wireless low power flexible and removably attachable tag placed on object to be tracked or located; SOFTWARE is initiated to begin location process; (Smart device display can display any number of potentially missing objects able to be searched for), a docking station sends out wake-up signal, the said docking station sends out code for missing object being searched for; there is a continuous repeat while person walks around in search of missing object; the tag with a passive receiver responds to initial wake-up signal, which generates sufficient voltage to wake up active transceiver which draws current from battery to run the active components which were formerly off and drew no current; It determines: Am I the address from step "B" you are looking for? (read binary code transmitted, compares to internal tag address), If No, (wait some number of No responses) compare, transceiver shuts off to save power, If YES, transmit active signal with modulated unique address to hand-held initiator assembly, hand-held initiator assembly receiver receives signal with modulated unique address and displays on screen of smart device that a reply has been received, and displays a relative intensity and corresponding distance missing object is likely to be found at; as the person(s) walks closer the return signal is correspondingly more powerful, which can be subjectively mapped into distance and/or to keep going in the same or different direction; as the person walks farther away the return signal is correspondingly weaker, which can be subjectively mapped into distance and/or to stop going in the same direction and change course; can generate in hand-held initiator assembly an audio or visual indication of getting positionally hotter or cooler; (For instance, a series of beeps can get louder and/or more frequent as position distance encloses.) The tag can also emit an audio signal and/or blink lights. A lower power version can let the hand-held initiator assembly use all the power; when finding object shut off search mode to end search mode and enable tag to power down to conserve battery power.

The present invention and method relates to a wireless low power flexible and removably attachable tag, a attaching device, and a wireless locating tracking initiator assembly, system and device which can be used to locate objects.

Although preferred embodiments of the present invention have been described it will be understood by those skilled in the art that the present invention should not be limited to the described preferred embodiments. Rather, various changes and modifications can be made within the spirit and scope of the present invention.

Definitions

A "controlling and/or operating software application" is defined as a program used to control, operate, operate on at least one of the following: a stationary and/or mobile device, a tablet, smart phone, stationary phone, smart device, computer, hand held device, mobile phone, touch-screen computing device, portable media player, smart pad, smart device, laptop, desktop computer, micro device, portable device, technical device, virtual device, a remote control, a communication transmitter device, a communication transmitter/receiver device, a tracking apparatus, and/or a communication receiver device, among others.

A "remote control" is defined as an electronic device used to wirelessly control another electronic device.

A "stationary and/or mobile device" is defined as an electronic device that can be at least one of the following: a tablet, smart phone, stationary phone, smart device, computer, hand held device, mobile phone, touch-screen computing device, portable media player, smart pad, smart device, laptop, desktop computer, micro device, portable device, technical device, and/or virtual device.

A "communication receiver device" is defined as any electronic device that can receive signals such as GPS, Wi-Fi, radio wave, Bluetooth, radio-frequency, sonar, sonic, audio, and infrared.

A "communication transmitter device" is defined as any electronic device that can transmit signals such as GPS, Wi-Fi, radio wave, Bluetooth, radio-frequency, sonar, sonic, audio, and infrared.

A "communication transmitter/receiver device" is defined as any electronic device that can transmit and/or receive signals such as GPS, Wi-Fi, radio wave, Bluetooth, radio-frequency, sonar, sonic, audio, and infrared.

SMART DEVICE: In the context of this invention a smart device is a mobile phone and/or what is commonly referred to as a smart phone such as including but not limited to an iPhone or an Android, a laptop computer, a desktop computer, a mainframe computer, computer, a tablet, a reader, a projection device and/or system.

The smart device can further be or comprise of at least one of at least one camera, RFID, GPS circuitry, at least one communication receiver device and/or the at least one communication transmitter device and/or the at least one communication transmitter/receiver device employing at least one of Wi-Fi, radio wave and/or electromagnetic radiation, and/or Bluetooth.

A smart device can be a multiplicity of smart devices, and reference to a smart device can be several smart devices, wherein one smart device can talk either directly to the internet or to at least one other smart device that in turn communicates to the Internet.

There can be any number of smart devices in the chain, forming serial and parallel paths for information to flow in one or two directions, and all the smart devices are individually and collectively referred to as the "smart device".

A smart device can comprise in whole or in part of the following components listed in no particular order:
- at least one microprocessor possessing at least one core;
- at least one memory;
- at least one display;
- at least one means to input data;
    - wherein said at least one means to input data is at least one of at least one camera, a touch screen, a keyboard, at least one form of wireless communication, at least one form of communication via at least one fiber optic cable, at least one form of communication via at least one wire connected to at least one mechanical connector with at least one electrical contact;
- at least one transceiver configured to communicate with at least one other smart device and/or with a server and/or a network capable of connecting to the internet;
- said components programmed to do the following:
    - sending at least one formatted list to at least one data base and/or
    - master data base resident in at least one physical location.

A surface (for purposes herein): any area, space, location, or surface of any object, item, creature, living creature, person, thing, or living thing.

A tag: device placed upon, inserted into, attached, or removably attached to at least one surface of any object, item, creature, person, thing, or living thing.

An item: any object.

An object: any item.

Tracking initiator assembly: locating device.

Tracking initiator assembly includes at least one smart device: locating device.

Docking station: part of locating device.

Wireless low power flexible and removably attachable tag: see tag above. a tg that runs unless power.

Although preferred embodiments of the present invention have been described it will be understood by those skilled in the art that the present invention should not be limited to the described preferred embodiments. Rather, various changes and modifications can be made within the spirit and scope of the present invention.

DETAILED DESCRIPTION OF KEY DRAWINGS

Figure 1:
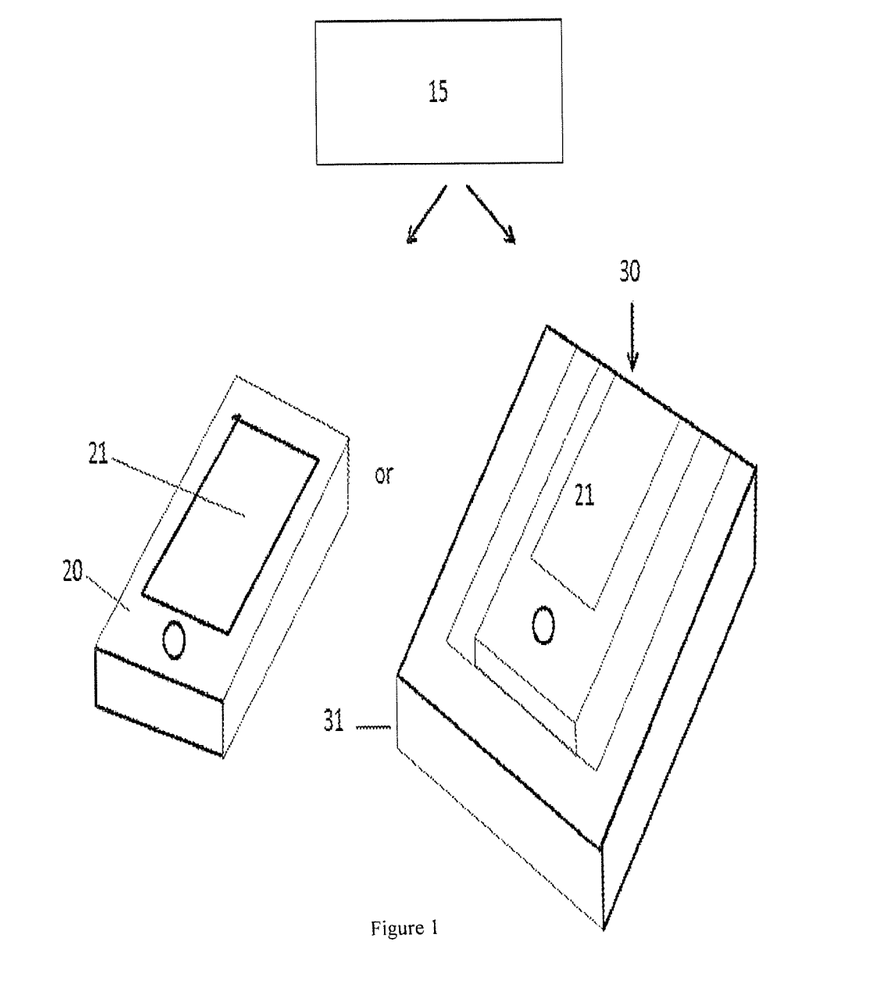
FIG. 1 depicts two embodiments of a tracking initiator assembly.

FIG. 1 depicts two embodiments of a tracking initiator assembly 15. One embodiment is a stand-alone Smart Device 20, which incorporates a Smart Device display 21. In this embodiment, stand-alone Smart Device 20 is capable of using its inherent wireless communication capability to either generate a transmission or to generate a transmission and receive wireless communication as well. This can include Wi-Fi, near field RF, Bluetooth, or any means within the capability of the stand-alone Smart Device 20. Similarly, the stand-alone Smart Device 20 can receive any of these signals if necessary. In this discussion, the term tag can mean at least one receiver wireless low power removeable attachable Tag 68 depicted in FIG. 4 and/or the transceiver wireless low power removeable attachable Tag 78 depicted in FIG. 5 and/or other tag embodiments not described but that do not depart from the spirit of the invention.

There can be one embodiment in which the stand-alone Smart Device 20 only transmits signals that are received by the tag, which is not shown in this figure, and in another embodiment, the stand-alone Smart Device 20 can both transmit and receive signals generate by and transmitted from the tag, thus enabling a bidirectional communication between the stand-alone Smart Device 20 and the tag. In either of these embodiments, the Smart Device display 21 can act both to display information and to input information into the stand-alone Smart Device 20.

Another embodiment of the tracking initiator assembly 15 can be a Smart Device 30 which is coupled into a Docking Station 31, and Smart Device 30 also incorporates the resident Smart Device display 21 which can act as both the means of entering data and/or information into the Smart Device 30 and to display data and/or information. In this embodiment, the Docking Station 31 can operate on one embodiment which only transmits signals that are received by the tag, which is not shown in this figure. Another embodiment the Docking Station 31 can operate as a transceiver which incorporates both transmission of signals from Docking Station 31 to the tag, which is not shown in this figure, and can also receive signals generated by and transmitted from the tag, thus enabling a bidirectional communication between the Docking Station 31 and the tag. In this embodiment, the Smart Device 30 communicates with the Docking Station 31, and can engage in bidirectional communication between the Smart Device 30 and the Docking Station 31. In this embodiment, the Docking Station 31 could have a more powerful transmitter so a search query could radiate a larger distance from the tracking initiator assembly 15.

Figure 2:
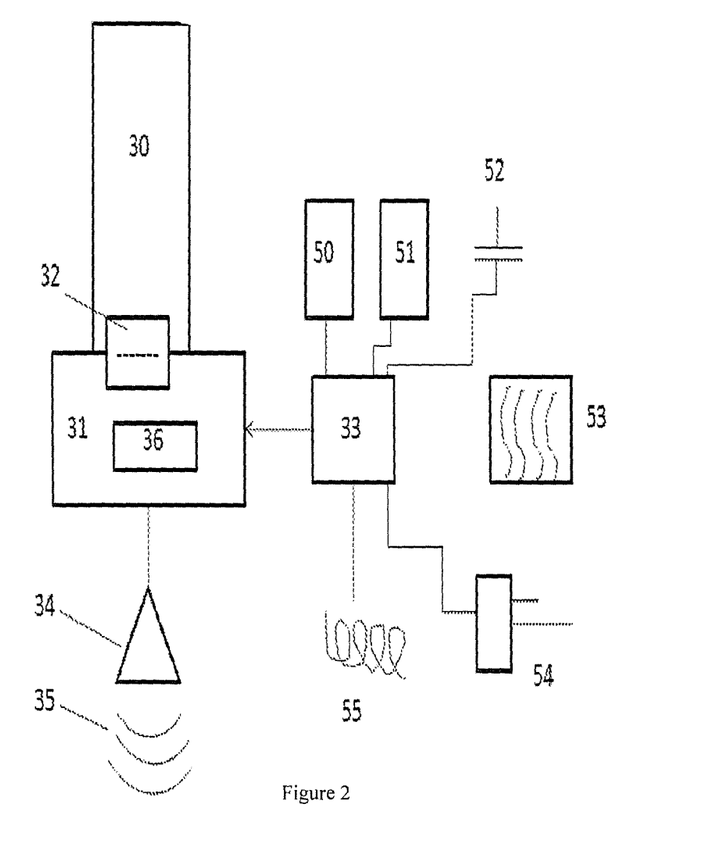
FIG. 2 depicts a block system diagram of the key components in a tracking initiator assembly that incorporates a transmitter only.

FIG. 2 depicts a block system diagram of the key components in a transmit only tracking initiator assembly 15 that incorporates a Smart Device 30 mated to Docking Station 31 via the Smart Device connector 32. Docking Station 31 contains a transmitter 34 and docking electronics and/or microprocessor 36 and docking power source 33. The Smart Device display 21 shown in FIG. 1 is not shown in this figure for clarity, but Smart Device display 21 is part of Smart Device 30. The docking power source 33 can be many different sources, and several representative sources are shown which include any of the following individually or in combination, and include non-rechargeable battery 50, rechargeable battery 51, capacitor 52, solar cell and/or panel 53, external power source 54, and coil and/or transformer and/or resonant circuit 55. The power source 33 can also come from the battery already contained within the Smart Device 30, in which case the power would be delivered from Smart Device 30 through the Smart Device connector 32 and into the Docking Station 31. If an embodiment uses a non-rechargeable battery 50, then this would require that there also be a battery compartment and an access panel or removeable door, neither of which is shown. Solar cell and/or panel 53 can be incorporated anywhere along the surface of the Docking Station 31. The external power source 54 can be a power brick that plugs into wall current, and can produce an AC voltage that can be rectified and regulated within the docking electronics and/or microprocessor 36, or the power brick that plugs into wall current can have a rectifier to produce a DC voltage and/or rectified to produce a DC voltage and regulated to produce a regulated DC voltage. Coil and/or transformer and/or resonant circuit 55 can be part of a wireless charging system whereby the Docking Station 31 can be placed on a charging coil or external assembly which is not shown, but which would produce an AC signal which inductively couples through the air and non-conductive portions of the Docking Station 31 and subsequently produces an AC voltage which in turn would be rectified and regulated.

Transmitter 34 can transmit transmitter emitting signal 35, which could be received by a tag when within range of the tag. In this embodiment, Smart Device 30 would act as the input device to enter data and/or information and to display data and/or information. Smart Device 30 would be running a tracking initiator assembly software application 19, not shown in this drawing because it is resident in the memory of the Smart Device 30, and would be obtained in any number of ways that software and applications are typically available, such as an app store or from a website, though not limited to these sources. Input data and/or information entered onto the Smart Device display 21 can take the form of defining what objects tags are associated with. For instance, a first tag can be placed on a key ring and associated with the name "key ring", a second tag can be placed on a wallet and associated with the name "wallet", and a third tag can be placed on a briefcase and associated with the name "briefcase". This can extend to any number of tags and items. If, for instance, a 16-bit code is used, 65,536 items can be uniquely defined. A 32-bit code can uniquely define 4,294,967,296 items. In the home, a few bits can go a long way, and in any commercial data and/or item archival environment, the utility of more than 32 bits is clear, with every added bit doubling the number of codes storable. A scenario could be to call up a menu displaying tagged items one could search for. If you are looking for your keys, you could click on the menu entry for "key ring", and the tracking initiator assembly 15 begins to send out the appropriate signals. For the embodiment of FIG. 2, this would be a transmit only search, and the tag on the key ring would respond when the tracking initiator assembly 15 is in range of the tag, which will be described in more detail in the description of FIG. 4.

Figure 3:
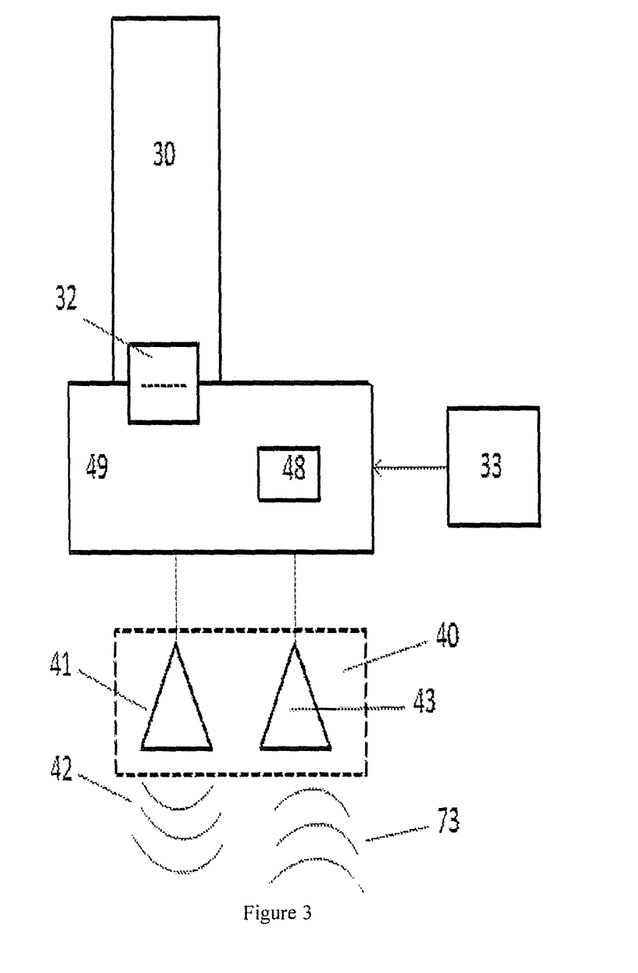
FIG. 3 depicts a block system diagram of the key components in a tracking initiator assembly that incorporates a transceiver incorporating both transmission and reception.

FIG. 3 depicts a block system diagram of the key components in a transmission and reception embodiment of a tracking initiator assembly 15 that incorporates a transceiver 40 incorporating both a transceiver transmitter 41 and a transceiver receiver 43. Like in FIG. 2, Smart Device 30 is mated this time to Transceiver Docking Station 49 via the Smart Device connector 32. Transceiver Docking Station 49 contains transceiver 40. Transceiver 40 contains transceiver transmitter 41 which transmits transceiver transmitter emitting signal 42 and also contains transceiver receiver 43 which receives tag active transceiver transmitter transmission 73. Transceiver Docking Station 49 also contains Transceiver docking electronics and/or microprocessor 48 and docking power source 33. The Smart Device display 21 shown in FIG. 1 is not shown in this figure for clarity, but it should be understood that Smart Device display 21 is part of Smart Device 30. The docking power source 33 can be many different sources and are the same as in FIG. 2 so they are not repeated here for brevity. The power source 33 can also come from the battery already contained within the Smart Device 30, in which case the power would be delivered from Smart Device 30 through the Smart Device connector 32 and into the Transceiver Docking Station 49. Solar cell and/or panel 53, if used in this embodiment, can be incorporated anywhere along the surface of the Transceiver Docking Station 49. Transceiver transmitter 41 can transmit transceiver transmitter emitting signal 42, which could be received by a tag when within range of the tag. Transceiver receiver 43 can receive tag active transceiver transmitter transmission 73 when within range of the tag. In this embodiment, Smart Device 30 would act as the input device to enter data and/or information and to display data and/or information. Smart Device 30 would be running a tracking initiator assembly software application 19, not shown in this drawing because it is resident in the memory of the Smart Device 30, and would be obtained in the way described in FIG. 2. In this transceiver 40 embodiment of the tracking initiator assembly 15, a search scenario could be to call up a menu displaying tagged items one could search for. Once again, if you are looking for your keys, you could click on the menu entry for key ring, and the tracking initiator assembly 15 begins to send out the transceiver transmitter emitting signal 42. The user would search a region of space by walking until within range of the tag, which will be described in more detail in the description of FIG. 5

Figure 4:
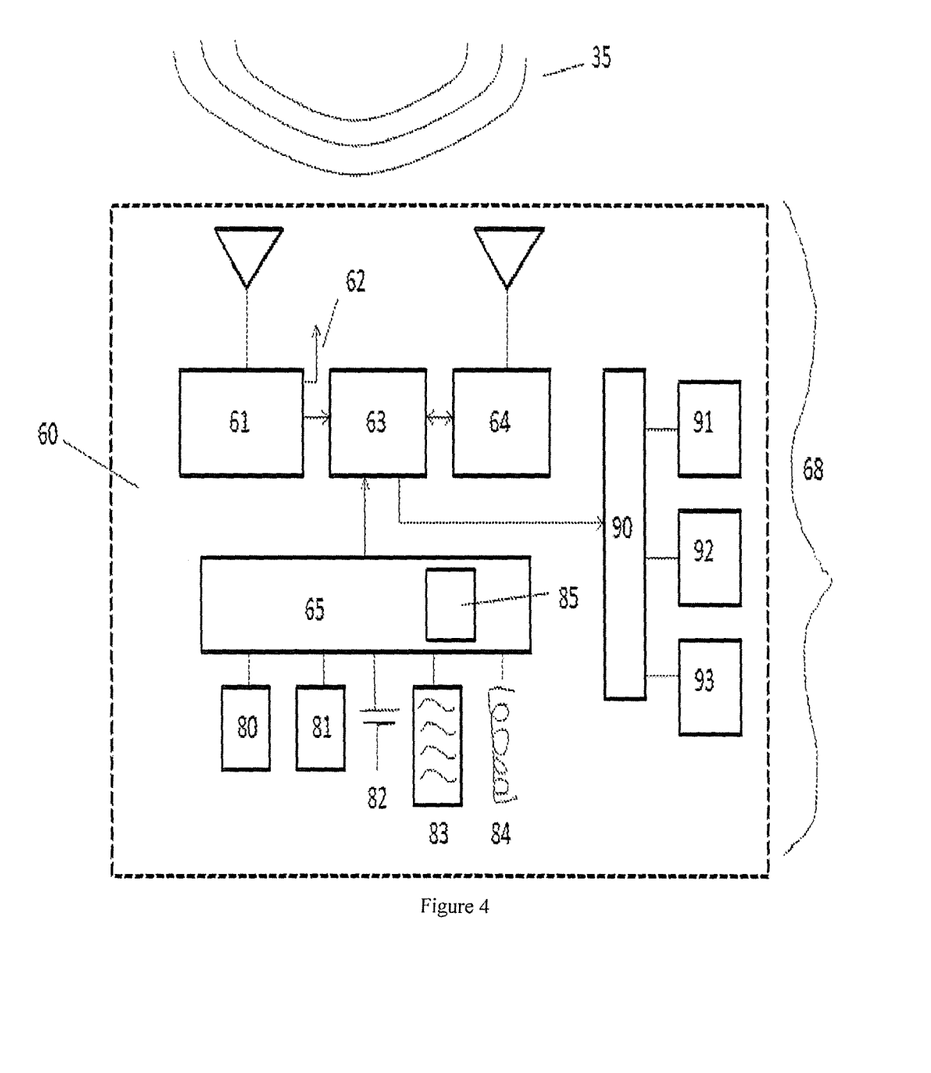
FIG. 4 depicts a block system diagram of the key components of a wireless low power removeable attachable Tag incorporating reception only.

FIG. 4 depicts a block system diagram of the key components of a receiver wireless low power removeable attachable Tag 68 incorporating reception only. Contained within the flexible tag housing 60 is passive receiver 61 which can receive transmitter emitting signal 35. This can either draw no power or very low power to not drain the battery significantly. This can then produce initiating signal 62, which can cause power to be applied to tag electronics and/or microprocessor 63, which can then cause power to be switched from at least one tag power source 65, and thus the tag electronics and/or microprocessor 63 can keep itself powered. This is a key feature of the invention, which is the ability to draw little or no current until enough of a signal is produced from the passive receiver 61, which draws little or no current from at least one tag power source 65 until enough energy is received from the transmitter emitting signal 35 that is generated from transmitter 34 of the tracking initiator assembly 15 depicted in FIG. 1 and FIG. 2. When the tag electronics and/or microprocessor 63 causes power to be sustained and applied to itself, it in turn causes power to be applied to the tag active receiver 64, which draws current from at least one tag power source 65. The tag active receiver 64 can then receive any modulated information in the transmitter emitting signal 35. The tag electronics and/or microprocessor 63 runs receiver tag software 69, not shown but resident with the memory contained within the tag electronics and/or microprocessor 63. Modulated within transmitter emitting signal 35 is at least one code and/or address 37, which is the code or address of the particular receiver wireless low power removeable attachable Tag 68 being searched for. When demodulated, this at least one code and/or address 37 is compared to at least one stored code and/or address 38, and if they are equal, the receiver wireless low power removeable attachable Tag 68 now knows that it is the receiver wireless low power removeable attachable Tag 68 being searched for. If the codes are not equal and the receiver wireless low power removeable attachable Tag 68 knows that it is not on or near the item being searched for, then it can automatically cause itself to power down so it no longer draws any current from at least one tag power source 65. If, however, the codes are equal and the receiver wireless low power removeable attachable Tag 68 knows it is in fact on or near the item being searched for, the tag electronics and/or microprocessor 63 can generate a signal to at least one physical output component 90, which can be at least one light 91, at least one sound producing element 92, and/or at least one vibrator and/or vibrating element 93. It can be any, all, or any combination of these. For instance, the receiver wireless low power removeable attachable Tag 68 can generate a blinking light sequence that is easily visible at a distance. It can also generate an audio sound and/or or sequence of sounds to lead the person to the item being searched for. It can also vibrate, which can be useful. There may be other outputs that can be employed without departing from the spirit of the invention. Different combinations, such as lights and sounds can be generated. When the item associated with the receiver wireless low power removeable attachable Tag 68 is located, the user can enter a code within Smart Device display 21 of any embodiment of the tracking initiator assembly 15, and this can send a sequence termination code 67 to the receiver wireless low power removeable attachable Tag 68 which can signal for at least one tag power source 65 to be disconnected from the tag active receiver 64 and the tag electronics and/or microprocessor 63, and thus the receiver wireless low power removeable attachable Tag 68 will cease to draw power from at least one tag power source 65 to conserve power.

At least one tag power source 65 can be at least one of a non-rechargeable battery 80, a rechargeable battery 81, a capacitor 82, at least on solar cell and/or solar panel 83, a coil and/or transformer and/or resonant circuit 84, and contained within the tag electronics and/or microprocessor 63 can be a voltage regulator and/or voltage converter 85, which can produce the necessary voltage to operate the receiver wireless low power removeable attachable Tag 68. If an embodiment uses a non-rechargeable battery 80, then this would require that there also be a battery compartment and an access panel or removeable door, neither of which is shown. Solar cell and/or panel 83 can be incorporated anywhere along the surface of the flexible tag housing 60. Coil and/or transformer and/or resonant circuit 84 can be part of a wireless charging system whereby the receiver wireless low power removeable attachable Tag 68 can be placed on a charging coil or external assembly which is not shown, but which would produce an AC signal which inductively couples through the air and non-conductive portions of the receiver wireless low power removeable attachable Tag 68 and subsequently produces an AC voltage which in turn would be rectified and regulated via the voltage regulator and/or voltage converter 85.

Figure 5:
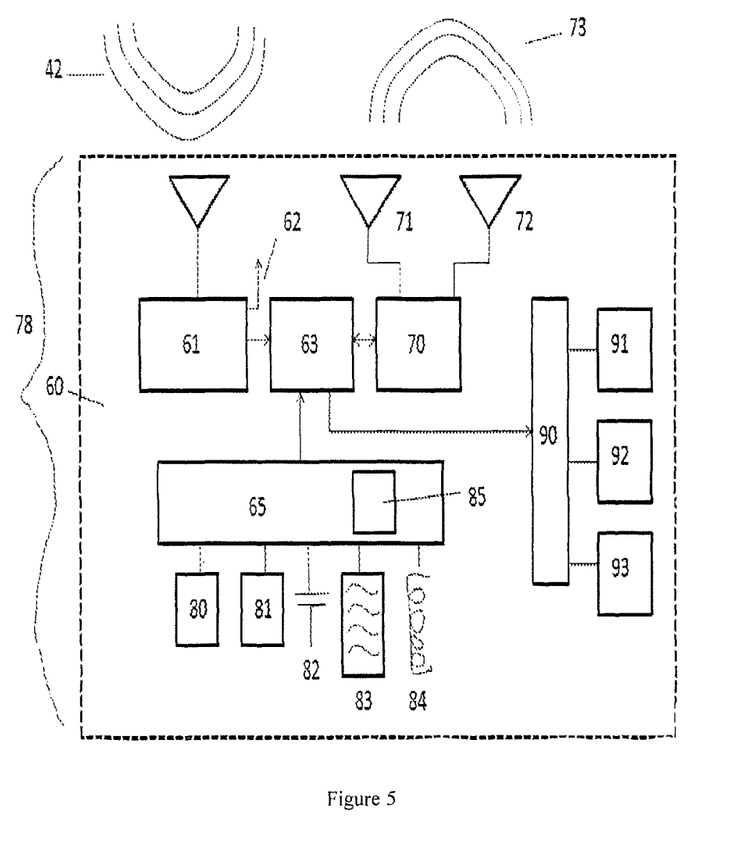
FIG. 5 depicts a block system diagram of the key components of a wireless low power removeable attachable Tag incorporating a transceiver incorporating both transmission and reception.

FIG. 5 depicts a block system diagram of the key components of a transceiver wireless low power removeable attachable Tag 78 incorporating a tag active transceiver 70. The tag active transceiver 70 contains the tag active transceiver receiver 71 capable of receiving transceiver transmitter emitting signal 42 generated from the transceiver transmitter 41 shown in FIG. 3, and the tag active transceiver 70 also contains the tag active transceiver transmitter 72 which is capable of generating tag active transceiver transmitter transmission 73 which can be received by transceiver receiver 43 shown in FIG. 3. Contained within the flexible tag housing 60 is the passive receiver 61, which can receive transceiver transmitter emitting signal 42. This can either draw no power or very low power to not drain the battery significantly. Similar to the embodiment depicted in FIG. 4, this can then produce initiating signal 62, which is capable of causing power to be applied to tag electronics and/or microprocessor 63, which can then cause power to be switched from at least one tag power source 65, and thus the tag electronics and/or microprocessor 63 is capable of keeping itself powered. Once again as depicted in FIG. 4, this provides the ability to draw little or no current until enough of a signal is produced from the passive receiver 61, which draws little or no current from at least one tag power source 65 until enough energy is received from the transceiver transmitter emitting signal 42 that is generated from transceiver transmitter 41 of the tracking initiator assembly 15 depicted in FIG. 1 and FIG. 3. When the tag electronics and/or microprocessor 63 causes power to be sustained and applied to itself, it in turn causes power to be applied to the tag active transceiver 70, which only then draws current from at least one tag power source 65. The tag active transceiver receiver 71 can then receive any modulated information in the transceiver transmitter emitting signal 42. The tag electronics and/or microprocessor 63 runs transceiver tag software 79, not shown but resident with the memory contained within the tag electronics and/or microprocessor 63. Modulated within transceiver transmitter emitting signal 42 is at least one code and/or address 37, which is the code or address of the particular transceiver wireless low power removeable attachable Tag 78 being searched for. When demodulated, this at least one code and/or address 37 is compared to at least one stored code and/or address 38, and if they are equal, the transceiver wireless low power removeable attachable Tag 78 now knows that it is the transceiver wireless low power removeable attachable Tag 78 being searched for. If the codes are not equal and the transceiver wireless low power removeable attachable Tag 78 knows that it is not on or near the item being searched for, then it can automatically cause itself to power down so it no longer draws any current from at least one tag power source 65. If, however, the codes are equal and the transceiver wireless low power removeable attachable Tag 78 knows it is in fact on or near the item being searched for, the tag electronics and/or microprocessor 63 can generate a signal to at least one physical output component 90, which can be at least one light 91, at least one sound producing element 92, and/or at least one vibrator and/or vibrating element 93. It can be any, all, or any combination of these. For instance, the transceiver wireless low power removeable attachable Tag 78 can generate a blinking light sequence that is easily visible at a distance. It can also generate an audio sound and/or or sequence of sounds to lead the person to the item being searched for. It can also vibrate, which can be useful. There may be other outputs that can be employed without departing from the spirit of the invention. Different combinations, such as lights and sounds can be generated.

Either before, during, or after the signal is sent to at least one physical output component 90, the tag active transceiver transmitter 72 can send at least one signal in at least one tag active transceiver transmitter transmission 73, which in turn can be received by the transceiver receiver 43 within the tracking initiator assembly 15. This can signal either the stand-alone Smart Device 20 and/or the Smart Device 30 that the transceiver wireless low power removeable attachable Tag 78 and the corresponding item being searched for is within range. This can then initiate a bidirectional communication sequence between the tracking initiator assembly 15 and the transceiver wireless low power removeable attachable Tag 78. Distances can be approximated through relative signal strengths and the interaction between the tracking initiator assembly software application 19 running in the tracking initiator assembly 15 and the transceiver tag software 79 running in the transceiver wireless low power removeable attachable Tag 78, and this can aid the user in locating the missing item in conjunction with at least one physical output component 90. When the item associated with transceiver wireless low power removeable attachable Tag 78 is located, the user can enter a code within Smart Device display 21 of any embodiment of the tracking initiator assembly 15, and this can send a sequence termination code 67 to the transceiver wireless low power removeable attachable Tag 78 which can signal for at least one tag power source 65 to be disconnected from the tag active transceiver 70 and the tag electronics and/or microprocessor 63, and thus the transceiver wireless low power removeable attachable Tag 78 will cease to draw power from at least one tag power source 65 to conserve power.

At least one tag power source 65 can be at least one of a non-rechargeable battery 80, a rechargeable battery 81, a capacitor 82, at least on solar cell and/or solar panel 83, a coil and/or transformer and/or resonant circuit 84, and contained within the tag electronics and/or microprocessor 63 can be a voltage regulator and/or voltage converter 85, which can produce the necessary voltage to operate the transceiver wireless low power removeable attachable Tag 78. If an embodiment uses a non-rechargeable battery 80, then this would require that there also be a battery compartment and an access panel or removeable door, neither of which is shown. Solar cell and/or panel 83 can be incorporated anywhere along the surface of the flexible tag housing 60. Coil and/or transformer and/or resonant circuit 84 can be part of a wireless charging system whereby the transceiver wireless low power removeable attachable Tag 78 can be placed on a charging coil or external assembly which is not shown, but which would produce an AC signal which inductively couples through the air and non-conductive portions of the transceiver wireless low power removeable attachable Tag 78 and subsequently produces an AC voltage which in turn would be rectified and regulated via the voltage regulator and/or voltage converter 85.

SOME SIGNIFICANT COMPONENTS

15 tracking initiator assembly
19 tracking initiator assembly software application
20 stand-alone Smart Device
21 Smart Device display
30 Smart Device
31 Docking Station
32 Smart Device connector
33 docking power source
34 transmitter
35 transmitter emitting signal
36 docking electronics and/or microprocessor
37 at least one code and/or address
38 at least one stored code and/or address
40 transceiver
41 transceiver transmitter
42 transceiver transmitter emitting signal
43 transceiver receiver
48 Transceiver docking electronics and/or microprocessor
49 Transceiver Docking Station
50 non-rechargeable battery
51 rechargeable battery
52 capacitor
53 solar cell and/or panel
54 external power source
55 coil and/or transformer and/or resonant circuit
60 flexible tag housing
61 passive receiver
62 initiating signal
63 tag electronics and/or microprocessor
64 tag active receiver
65 at least one tag power source
67 sequence termination code
68 receiver wireless low power removeable attachable Tag
69 receiver tag software
70 tag active transceiver
71 tag active transceiver receiver
72 tag active transceiver transmitter
73 tag active transceiver transmitter transmission
78 transceiver wireless low power removeable attachable Tag
79 transceiver tag software
80 non-rechargeable battery
81 rechargeable battery
82 capacitor
83 solar cell and/or solar panel
84 coil and/or transformer and/or resonant circuit
85 voltage regulator and/or voltage converter
90 at least one physical output component
91 at least one light
92 at least one sound producing element
93 at least one vibrator and/or vibrating element

FOUR KEY FEATURES OF THE INVENTION

1. Tracking initiator assembly
2. Wireless low power removable attachable Tag placed on or near an object and/or Surface to be tracked
3. A tracking initiator assembly software application running in said tracking initiator assembly and tag software running in said tag, said tracking initiator assembly software application and said tag software interacting in a manner permitting communication between said tracking initiator assembly and said tag and to cause at least one output response in said tag
4. The output sequence may be at least one of at least one light sequence, or at least one audio sequence.

What is claimed:
1. A wireless locating system comprising of the following:
A) at least one tracking initiator assembly comprising:
at least one stand-alone Smart Device,
or
at least one Smart Device removeably attachable to at least one Docking Station, said Docking Station comprising of:
a mechanical cradle to accept said at least one Smart Device;
at least one Smart Device connector;
at least one transmitter or at least one transceiver, said at least one transceiver comprising at least one transceiver transmitter and at least one transceiver receiver;
at least one docking power source,
said at least one docking power source derives from at least one of the following:
said at least one Smart Device,
at least one non-rechargeable battery,
at least one rechargeable battery,
at least one capacitor,
at least one of a solar cell and a solar panel,
at least one of a coil, transformer and a resonant circuit,
at least one of a voltage regulator and a voltage converter,
at least one of an external source derived from a wall current powered power supply and an external DC source, and docking electronics or microprocessor;
said at least one transmitter is capable of transmitting at least one transmitter emitting signal capable of at least one of the following:
modulating information and not modulating information, wherein said information is at least one of a code and an address;
or
said at least one transceiver transmitter is capable of transmitting at least one transceiver transmitter emitting signal capable of at least one of the following:
modulating information and not modulating information, wherein said information is at least one of a code and an address;
and
said at least one transceiver receiver is capable of receiving at least one of the following: at least one frequency; at least one frequency with modulated information; and at least one tag active transceiver transmitter transmission;

B) a wireless low power removeable attachable Tag placed on or near at least one of an object and a Surface to be tracked comprising:
at least one housing with at least one of an attaching device and an attachment area;
a passive receiver requiring no power that produces an initiating signal as a result of receiving said transmitter emitting signal or said transceiver transmitter emitting signal;
at least one tag power source, said at least one tag power source is at least one of the following:
at least one non-rechargeable battery,
at least one rechargeable battery,
at least one capacitor,
at least one of a solar cell and a solar panel,
at least one of a coil, transformer and a resonant circuit, and
at least one of a voltage regulator and a voltage converter;
at least one of a tag electronics and a microprocessor capable of being connected to and disconnected from said at least one tag power source;
at least one tag active receiver or at least one tag active transceiver capable of being connected to and disconnected from said at least one tag power source, said at least one tag active transceiver comprising at least one tag active transceiver receiver and at least one tag active transceiver transmitter;
at least one physical output component capable of being controlled by at least one of said tag electronics and said microprocessor,
said at least one physical output component comprising at least one of the following: at least one light, at least one sound producing element, at least one of a vibrator and a vibrating element;
at least one of a stored code and an address stored within at least one of said tag electronics and said microprocessor;
said at least one tag active receiver capable of receiving said transmitter emitting signal, or said at least one tag active transceiver receiver capable of receiving at least one said transceiver transmitter emitting signal and said at least one tag active transceiver transmitter capable of transmitting at least one tag active transceiver transmitter transmission;
said tag electronics and/or microprocessor being activated by said initiating signal;
at least one of said tag electronics and said microprocessor capable of generating at least one power on signal capable of causing power be applied to and removed from at least one of said tag electronics and said microprocessor; said at least one power on signal capable of causing power to be applied to and removed from said at least one tag active receiver or said at least one tag active transceiver;

C) a tracking initiator assembly software application running in said tracking initiator assembly and tag software running in said tag, said tracking initiator assembly software application and said tag software interacting to permit communication between said tracking initiator assembly and said tag and to cause at least one output response in said tag comprising the following:
selection of at least one of said object, Surface, and said tag using said at least one stand-alone Smart Device or said at least one Smart Device removeably attachable to at least one Docking Station, said selection causing at least one of the emission and the transmission of at least one said transmitter emitting signal or at least one said transceiver transmitter emitting signal with or without modulation;
reception of said at least one said transmitter emitting signal or at least one said transceiver transmitter emitting signal by said passive receiver;
said passive receiver generates said initiating signal;
said initiating signal causes at least one of said tag electronics and said microprocessor to generate said at least one power on signal;
said tag electronics and/or microprocessor initiates at least one timer producing at least one time out time;
said at least one time out time capable of causing at least one power on signal to switch from at least one state to at least one other state, thus causing said power to be disconnected from at least one of said tag electronics, microprocessor and said at least one tag active receiver or at least one tag active transceiver;
said tag active receiver or tag active transceiver receiver capable of demodulating said information and producing at least one receiver output;
said receiver output being received by said tag electronics and/or microprocessor,
at least one of said tag electronics and said microprocessor decoding at least one of said at least one code and said address and comparing to at least one of said at least one stored code and said address, and if at least one of said at least one code and said address is identical to at least one of said at least one stored code and said address, producing at least one valid positive ID output;
said at least one valid positive ID output triggering at least one of the following:
at least one output sequence for at least one period of tag identification calling time, switching said at least one power on signal to a power off state.

2. The wireless locating system of claim 1, wherein said at least one output sequence is at least one of at least one light sequence, or at least one audio sequence.

3. The wireless locating system of claim 1, further comprising that the transmission from transmitter or transceiver transmitter be at least one object found code to be received by said tag active receiver or tag active transceiver receiver, said at least one object found code causing said tag active receiver to power down and at least one of said tag electronics and said microprocessor to power down, or said at least one object found code causing said tag active transceiver to power down and at least one of said tag electronics and said microprocessor to power down.

4. The wireless locating system of claim 1, whereby the said at least one smart device display can display any number of potentially missing objects able to be searched for and can display and search for an ever-expanding menu of at least one of icons and names of searchable things.

5. The wireless locating system of claim 1, wherein the tracking initiator assembly can receive and/or transmit at least one of the following signals: GPS, Wi-Fi, RFID, radio wave, Bluetooth, radio-frequency, sonar, sonic, audio, vibration, light, solar energy, sound, and infrared.

6. The wireless locating system of claim 1, wherein the tag can receive and/or transmit at least one of the following signals: GPS, Wi-Fi, RFID, radio wave, Bluetooth, radio-frequency, sonar, sonic, audio, vibration, light, solar energy, sound, and infrared.

7. The wireless locating system of claim 1, wherein said tracking initiator assembly further comprises at least one power source.

8. The wireless locating system of claim 7, wherein the at least one power source further is comprised of at least one of: at least one battery, at least one battery compartment, at least one battery compartment door, at least one coil for harvesting electromagnetically coupled energy, a rectifier, at least one storage component, voltage regulator, power management processor and system.

9. The wireless locating system of claim 1, wherein said at least one tracking initiator assembly is at least one control device in the form of or having the function of at least one remote control.

10. The wireless locating system of claim 9, wherein said at least one control device further comprises at least one of a button, switch or other controller capable of producing a signal corresponding to at least one said tag that, when depressed or initiated or activated, causes a query signal to be sent from said at least one control device to said at least one said tag.

11. The wireless locating system of claim 1, wherein said at least one tracking initiator assembly is at least one control device in the form of or having the function of at least one remote control; and
said wireless low power removeable attachable tag further comprises at least one of the following: a speaker, an audio or sound producing device, a lighting system, a light source, and/or a vibrating device.

12. The wireless locating system of claim 11, wherein the at least one control device can send at least one signal from the at least one communication transmitter device or communication transmitter/receiver device located in the control device to the at least one communication receiver device or communication transmitter/receiver device located in/on/as the tag that results in the at least one speaker and/or audio device, if present, emitting a sound, the lighting system and/or light system, if present, illuminating, the vibrating device, if present, vibrating, and/or the at least one communication receiver device or communication transmitter/receiver device transmitting sending at least one signal to the at least one communication transmitter device or communication transmitter/receiver device.

13. The wireless locating system of claim 1, further comprising at least one of the following:
at least one LED light;
at least one of a switch, sensor, and connector;
circuitry to control at least one LED light; and
at least one of a transparent and translucent flexible exterior material permitting the transmission of light.

14. The wireless locating system of claim 13, wherein at least one of the following:
at least one of sensing by and connecting to electronics of at least one of said
at least one switch, at least one sensor and at least one connector;
at least one of said at least one switch and at least one sensor can be at least one of a motion, acceleration and impact activated;
at least one of motion and said at least one sensor output can cause electronics to remain active for a minimum period of time;
if at least one of motion and said at least one sensor output has not caused activation for said minimum period of time, the electronics enters a low current sleep mode to conserve battery energy;
at least one of motion and said at least one sensor output can initiate wake up of electronics from a low current mode;
the wireless locating device further comprises electronics able to control the lighting of said at least one LED light in at least one sequence; and
at least one of said at least one switch and at least one sensor activation can initiate at least one lighting sequence.

15. The wireless locating system of claim 14, wherein at least one of the following:
lighting sequence is at least one of the following: repetitive, and random;
lighting sequence can incorporate at least one of the following:
constant timing, variable timing, and a dimming function;
sensor can sense acoustic energy and audio from the environment and convert at least one of said acoustic energy and audio into a signal; and
said at least one connector is a connector and jack for connecting to at least one of an audio source and power.

16. The wireless locating system of claim 15, wherein said signal can be resolved into at least one of a frequency and an amplitude.

17. The wireless locating system of claim 16, wherein at least one of said frequency and said amplitude can control or affect at least one of a pattern and intensity of LED lighting.

18. The wireless locating system of claim 1, wherein the housing is flexible and bendable, and the attaching device which allows for attaching to surfaces is an adhesive.

19. A method of use for a wireless locating system comprising:
at least one of downloading, initiating, and running, a software application for running at least one wireless locating device of the wireless locating system;
placing at least one tag possessing at least one address on or near at least one of a surface and an object that may need to be located at a future time;
turning on and/or activating said at least one wireless locating device;
defining in said at least one wireless locating device at least one of a surface and an object requiring locating;
causing a query signal comprising said at least one address to be sent from said at least one wireless locating device;
receiving said query signal by the at least one tag;
self-identifying by the at least one tag that it is or is not the tag possessing said at least one address and the tag being addressed; and generating by the at least one tag at least one output sequence for at least one period of time.

20. The method of claim 19, further comprising at least one of the following steps:

hearing at least one sound emitted from at least one speaker and/or sound system located in the at least one tag when the at least one wireless locating device sends information to, and retrieves information from the at least one tag;

seeing at least one light emitted from at least one light source and/or lighting system located in the at least one tag when the at least one wireless locating device sends information to, and/or retrieves information from the at least one tag;

feeling or listening for vibration(s) from at least one vibrating device located in the at least one tag when the at least one wireless locating device sends information to, and retrieves information from the at least one tag;

sending information/data, or other signals or interaction about distance, between the at least one wireless locating device and the at least one tag; and/or updating, at least once, information about the distance between the at least one wireless locating device and the at least one tag.

21. The method of claim 20, further comprising the step of removing said at least one tag from the at least one of a surface and an object.

22. A method for using a wireless locating system comprising the following:

placing a wireless low power flexible and removably attachable tag on an object to be tracked or located;

initiating software on a hand held-initiator assembly to begin location process;

displaying on a Smart device any number of potentially missing objects to be searched;

sending a wake-up signal by a docking station;

the docking station sending the code for the missing objects being searched;

sending the code repeatedly while searching for the missing object;

the tag further comprising a passive receiver and an active transceiver, responding by the passive receiver to the wake-up signal generates sufficient voltage to wake up the active transceiver which draws current from a battery to run the following steps:

determining by the locating system:

the tag having an address, wherein the determining comprising the locating system transmitting and reading a binary code, and comparing the binary code to the internal tag address to find a match, shutting off the transceiver to save power If the binary code does not match and no match is found after a pre-determined number of comparisons are made, transmitting an active signal with modulated unique address to the hand-held initiator assembly if the binary code does match, and displaying on the screen of the smart device that a reply has been received, and displaying a relative intensity and corresponding distance missing object is likely to be found;

as the person walks closer a return signal is correspondingly more powerful, which can be subjectively mapped into distance and/or to keep going in the same or different direction; and as the person walks farther away the return signal is correspondingly weaker, which can be subjectively mapped into distance and/or to stop going in the same direction and change course; and the method further comprising at least one of the following steps:

generating by the hand-held initiator assembly, an audio or visual indication of getting positionally closer to or farther away from a matching tag;

emitting by the tag at least one of an audio signal and blinking lights; and the method further comprising:

shutting off search mode when finding object, to end search mode and enable tag to power down to conserve battery power.

* * * * *